(12) United States Patent
Olsson et al.

(10) Patent No.: US 7,825,647 B2
(45) Date of Patent: Nov. 2, 2010

(54) METHOD FOR LOCATING BURIED PIPES AND CABLES

(75) Inventors: Mark S. Olsson, La Jolla, CA (US);
Priscilla S. McLaughlin, San Diego, CA (US); Jan Soukup, San Diego, CA (US)

(73) Assignee: Seektech, Inc., San Diego, CA (US)

( * ) Notice: Subject to any disclaimer, the term of this patent is extended or adjusted under 35 U.S.C. 154(b) by 0 days.

(21) Appl. No.: 12/480,615

(22) Filed: Jun. 8, 2009

(65) Prior Publication Data

US 2009/0243583 A1 Oct. 1, 2009

Related U.S. Application Data

(62) Division of application No. 11/455,563, filed on Jun. 19, 2006, now Pat. No. 7,557,559.

(51) Int. Cl.
*G01R 19/00* (2006.01)
*G01V 3/08* (2006.01)

(52) U.S. Cl. .......................................... 324/67; 324/326

(58) Field of Classification Search ....................... None
See application file for complete search history.

(56) References Cited

U.S. PATENT DOCUMENTS

| 2,084,523 | A | * | 6/1937 | Crawford | 361/221 |
| 3,935,670 | A | * | 2/1976 | Pluenneke et al. | 47/1.3 |
| 3,991,363 | A | * | 11/1976 | Lathrop | 324/529 |
| 5,194,812 | A | * | 3/1993 | Yokoi | 324/326 |
| 5,808,852 | A | * | 9/1998 | Iannotti | 361/220 |
| 6,529,006 | B1 | * | 3/2003 | Hayes | 324/326 |

* cited by examiner

*Primary Examiner*—Jay M Patidar
(74) *Attorney, Agent, or Firm*—Michael H. Jester (57) ABSTRACT

A method of locating a buried conductor such as a pipe uses an electronic transmitter to generate a signal having a predetermined frequency with is applied to the pipe via an alligator clip or other appropriate connector. A ground connection to the transmitter is established by connecting another alligator clip or other appropriate connector to a grounding sheet made of chain mail or metal cloth. A electrolyte solution is poured on the grounding sheet and/or around a portion of the surface region adjacent the grounding sheet. The signal that is re-radiated by the buried pipe is detected with a man portable locator which determines the location of the buried pipe and displays the same to a user.

5 Claims, 13 Drawing Sheets

METHOD FOR LOCATING BURIED PIPES AND CABLES

This application is a division of U.S. patent application Ser. No. 11/455,563, which was filed Jun. 19, 2006 now U.S. Pat. No. 7,557,559, and which is as of the filing of this application.

FIELD OF INVENTION

The present invention relates to electronic systems and methods for locating buried or otherwise inaccessible pipes, cables and conductors by detecting an electromagnetic signal emitted by these buried objects.

BACKGROUND

During construction that involves excavation, it is prudent to determine the actual location of buried pipes, cables, gas lines, AC electric lines, sprinkler wires, CATV cable, communications wiring, and so forth. This is usually done with a portable hand-held locator that senses electromagnetic signals emitted by such buried objects. This is because maps of such buried objects, if they are available at all, are often not complete and/or accurate. Where buried utilities carry an electric signal, such as power lines, often no additional signal need be applied to perform the location. But many pipes and other conduits have no electromagnetic emission that is readily detectable. While a metal water pipe or gas pipe may, for example, re-radiate surrounding electromagnetic signals, the re-radiated signals are weak, and spread over many different frequencies. This makes the location of such buried utilities with a conventional hand-held locator very difficult. A solution is to apply an external signal from an electronic transmitter usually tuned to a specific frequency optimized for the particular application. Hand held locators with antennas, displays and audible tone generators are then used to trace the pipe, whose location is then marked on the ground or pavement with spray paint in a color which indicates whether the pipe carries water or gas, for example. Typically alligator clips attached to leads are used to apply the signal to pipes. A ground spike may be used where access to only one end of the pipe is available for connecting an alligator clip. Many buried utilities and other objects are shielded with insulation or other dielectric coating. Therefore, inductive clamps are used to induce a signal at a predetermined desired frequency without making any direct electrical connection to the metal conductor in the buried utility or other buried object.

Electronic transmitters used in locating buried pipes typically comprise a portable housing with a battery powered signal generating circuit. External jacks are used to connect cords or leads that terminate in an alligator clip or an inductive clamp. A small number of controls are provided, which may include switches for ON/OFF control, mode selection and frequency selection. The housing is usually relatively large and the storage and use of the leads, clips and ground spike are cumbersome.

SUMMARY OF THE INVENTION

In accordance with an aspect of the invention, a line illuminator includes a circuit for generating a signal suitable for tracing a buried conductor. First and second leads each have a first end connected to the circuit and a second end connected to a corresponding mechanism for applying the signal to a buried conductor. A case encloses the circuit and is configured for having the first and second leads wrapped around an exterior of the case. Mechanisms are provided for holding the leads wrapped around the exterior of the case.

In accordance with another aspect of the invention a method of locating a buried conductor includes the steps of generating a pseudo sine wave electric signal with a fractional ON time at a predetermined frequency, applying the pseudo sine wave signal to a buried conductor, detecting an electromagnetic signal emitted by the conductor, and determining a location of the conductor from the detected electromagnetic signal.

In accordance with another aspect of the invention a method of locating a buried conductor includes the steps of generating an electric signal having at least one predetermined frequency, applying the signal to a buried conductor, establishing a ground connection using a flexible grounding sheet overlying a surface region above the buried conductor, detecting an electromagnetic signal emitted by the conductor, and determining a location of the conductor from the detected electromagnetic signal.

DETAILED DESCRIPTION

Referring to FIGS. 1-5, in accordance with an embodiment of the invention, a compact line illuminator 10 includes a circuit in the form of a PC board 12 (FIG. 6) supporting interconnected components for generating an oscillating electric signal suitable for tracing a buried conductor (not illustrated). The compact line illuminator 10 can operate in direct connection, inductive clamp and inductive antenna modes selectable through a control panel hereafter described. It can also operate at different frequencies and different power levels selected through the control panel. Most of the mechanical structure of the compact line illuminator 10 is made of injection molded plastic parts. A pair of tubes 14 and 16 hold a portable power source in the form of six C battery cells (not illustrated) that can energize the circuit. A pair of leads 18 and 20 (FIG. 1) have inner ends connected to the PC board 12 and outer ends connected to corresponding alligator clips 22 and 24 for attaching the leads 18 and 20 to a buried conductor such as a gas or water pipe. The leads 18 and 20 may comprise, for example, insulated 7×19 bundles of composite (mixed strands) of stainless steel and copper aircraft cable. Where only one end of the buried pipe is accessible, one of the alligator clips 22 or 24 may be attached to a J-shaped ground spike 26 (FIG. 6) whose longer segment may be inserted in tubular receptacle 28 mounted inside the compact line illuminator 10. Instead of using the ground spike 26, one of the alligator clips may be connected to a ground mat or sheet 96 as explained hereafter in connection with FIG. 12.

Figure 6:
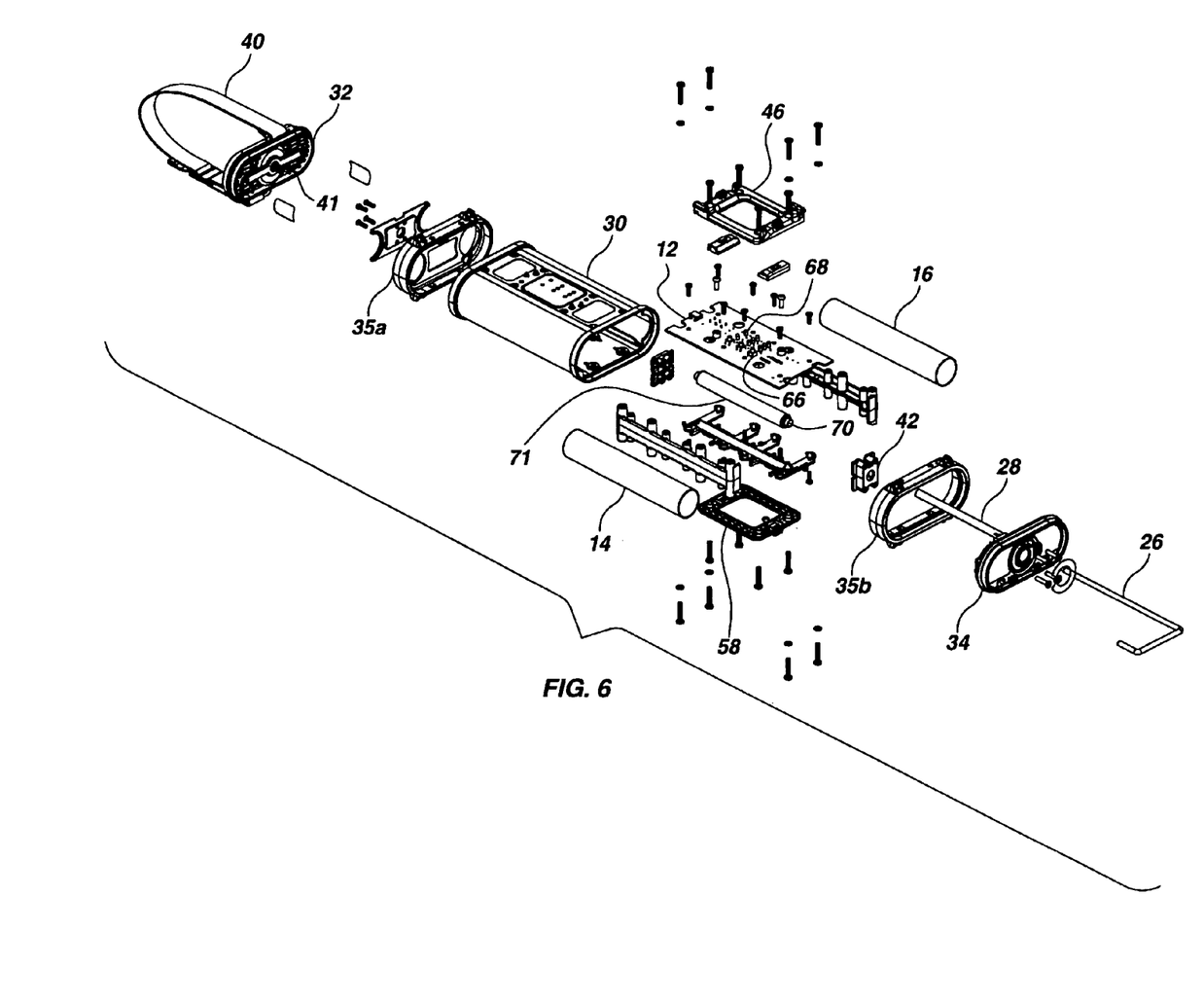
FIG. 6 is a reduced exploded isometric view of the compact line illuminator of FIGS. 1-5.
Figure 7A:
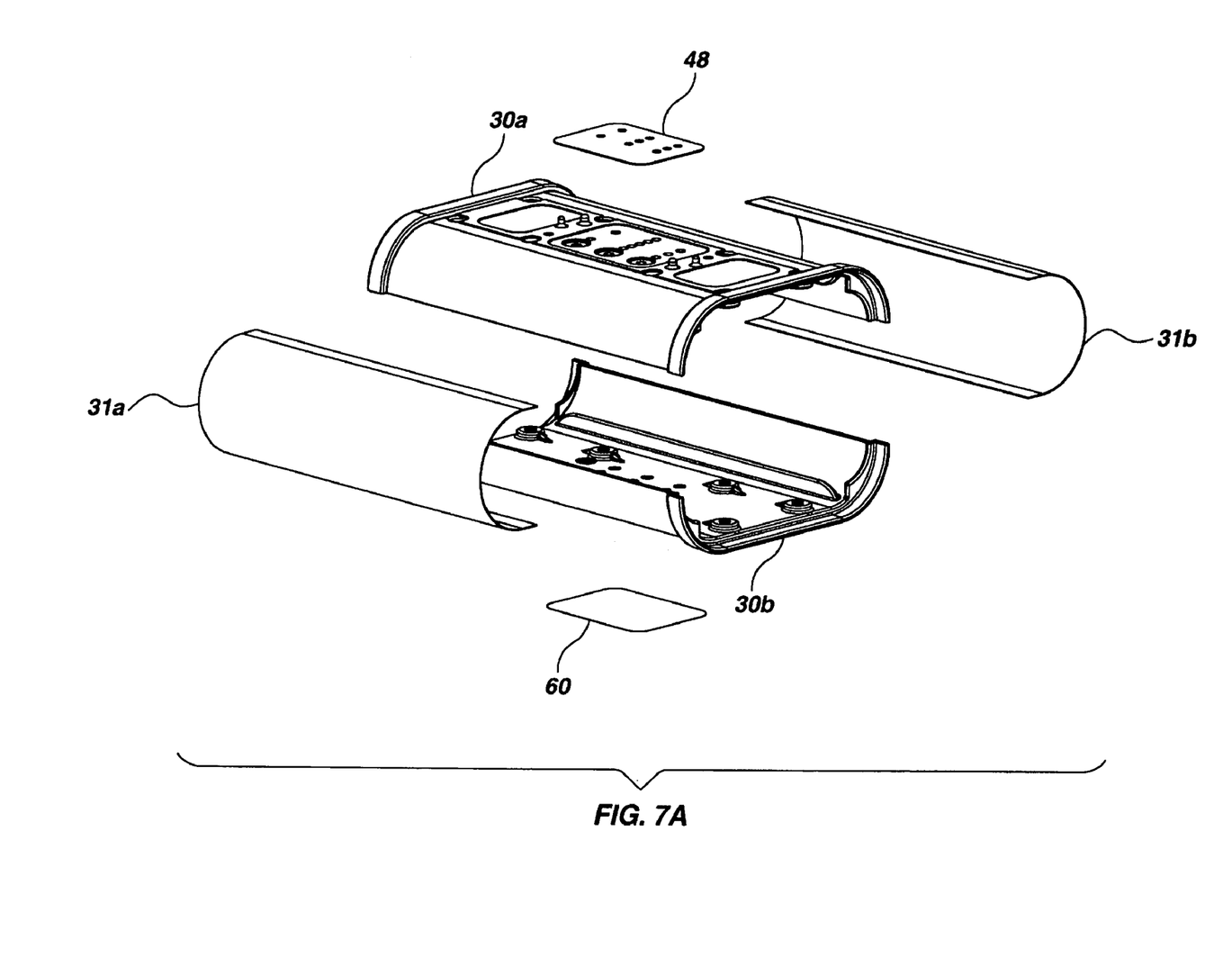
FIG. 7A is a reduced partial exploded isometric view illustrating the assembly of the case of the compact line illuminator of FIGS. 1-5 using rolled side labels. The end cap assemblies are not illustrated in this view.
Figure 7B:
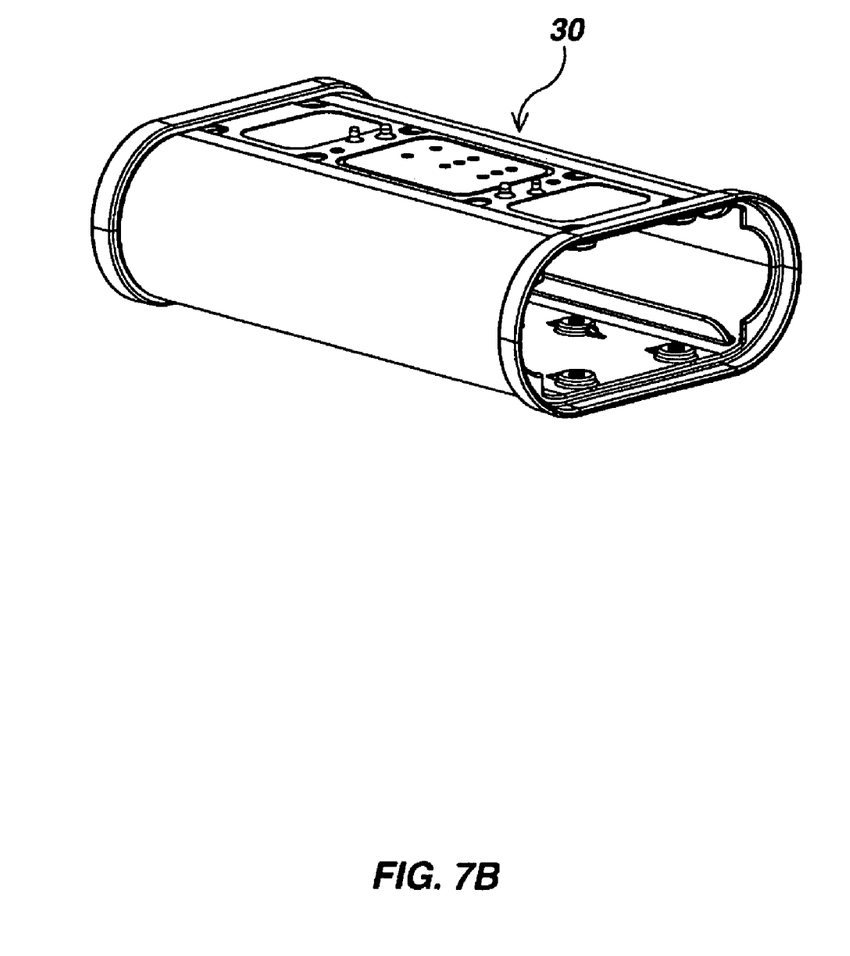
FIG. 7B is an isometric view of the assembled components illustrated in FIG. 7A.

A case 30 (FIGS. 1-5) encloses the PC board 12 and the battery holding tubes 14 and 16. The case 30 is configured for having the leads 18 and 20 conveniently wrapped around the smooth exterior of the case 30. The case 30 includes mating upper and lower symmetrical shells 30a and 30b (FIG. 7A) that form an elongated flattened tube having rounded outer side walls connecting opposing planar sections as best seen in FIG. 7B. Adhesive labels 31a and 31b are adhered to the rounded outer walls and seal the seam between the shells 30a and 30b. The case 30 further includes a pair of end cap assemblies 32 and 34 (FIG. 6). A leaf spring (not illustrated) presses against the shorter segment of the ground spike that is parallel with the longer segment when the longer segment is inserted into the receptacle. The shorter segment of the ground spike 26 slides through an aperture in the end cap assembly 34. The leaf spring retains the ground spike 26 in its stowed position.

Elastomeric bumpers 35a and 35b (FIG. 16) surround opposite ends of the case 30 adjacent the end cap assemblies 32 and 34. The bumpers 35a and 35b provide outer shoulders that retain the wrapped leads 18 and 20 and prevent them from sliding off the case 30. Both the end cap assemblies 32 and 34 seal to the case 30 in watertight fashion. Pairs of H-shaped short legs 36 and 38 (FIG. 5) are integrally formed with, and extend from, the bumpers 35a and 35b on both the upper and lower sides of the compact line illuminator 10. An adjustable carrying strap 40 is secured to the end cap assembly 32. The strap can be lengthened by adding a segment (not illustrated) so that it can be used as a shoulder strap, or shortened so that it can be secured around the technician's waste belt. The end cap assembly 32 can be removed by manually removing a large screw 41 (FIG. 6) by twisting on a knob (not illustrated) to thereby allow the six C batteries to be replaced.

Figure 9:
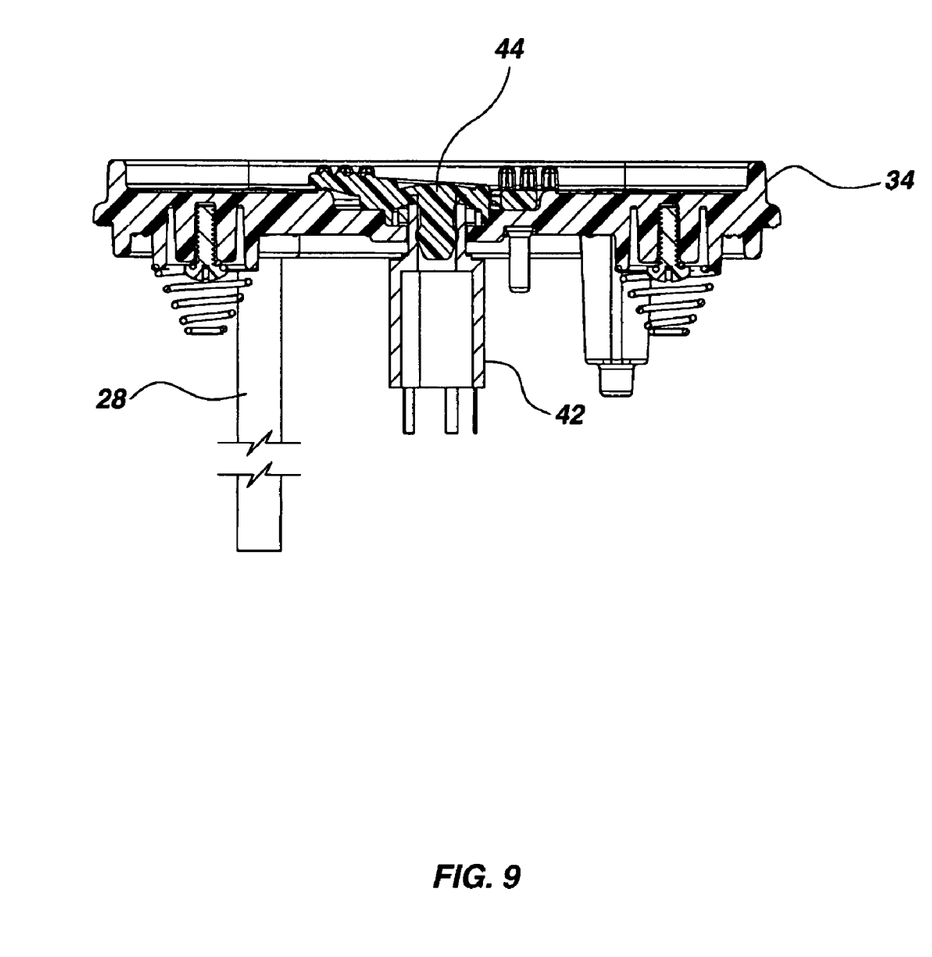
FIG. 9 is an enlarged cross-sectional view of one of the end cap assemblies of the compact line illuminator of FIGS. 1-5.

The circuit of the compact line illuminator 10 includes a phone jack connector 42 (FIG. 9) mounted to the end cap assembly 34 that allows an inductive clamp to be connected to the circuit on the PC board 12. An example of an inductive clamp suitable for use with the compact line illuminator 10 is disclosed in U.S. Pat. No. 7,288,929 granted Oct. 30, 2007 of Jeffrey A. Prsha et al., the entire disclosure of which is hereby incorporated by reference. A hinged elastomeric cover 44 (FIGS. 1 and 9) is mounted to the end cap assembly 34 for sealing the female phone jack when not in use. The case 30 further includes a rectangular top frame cover 46 (FIG. 6) secured to the top planar section of the case 30. The top frame cover 46 surrounds an interface label 48 (FIG. 7A) and provides a pair of inner shoulders that keep the wrapped leads 18 and 20 separated, i.e. wound into their respective areas at each end of the case 30.

Figure 1:
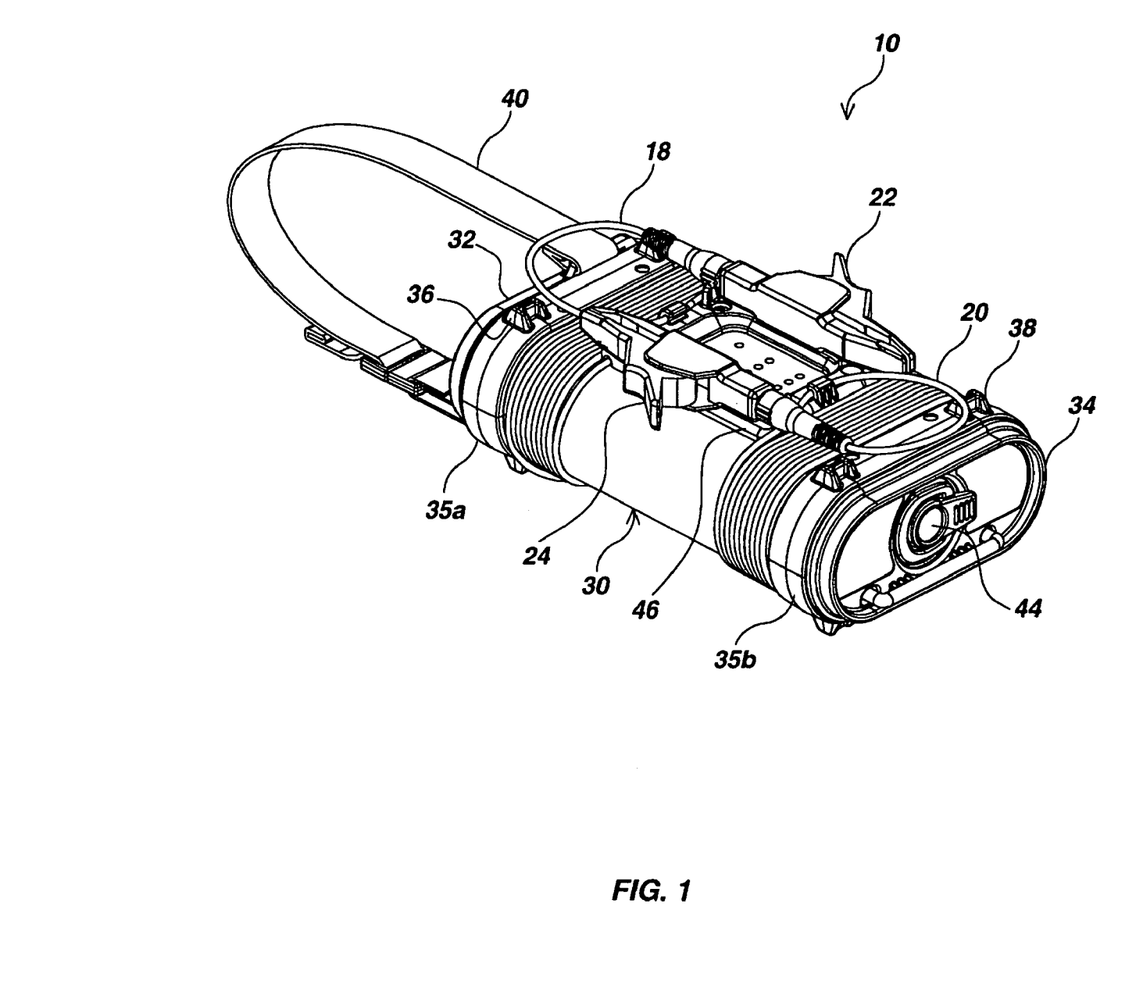
FIG. 1 is an isometric view of a compact line illuminator in accordance with an embodiment of the invention illustrating both its leads in a fully wrapped state and both its alligator clips secured to its case.
Figure 2:
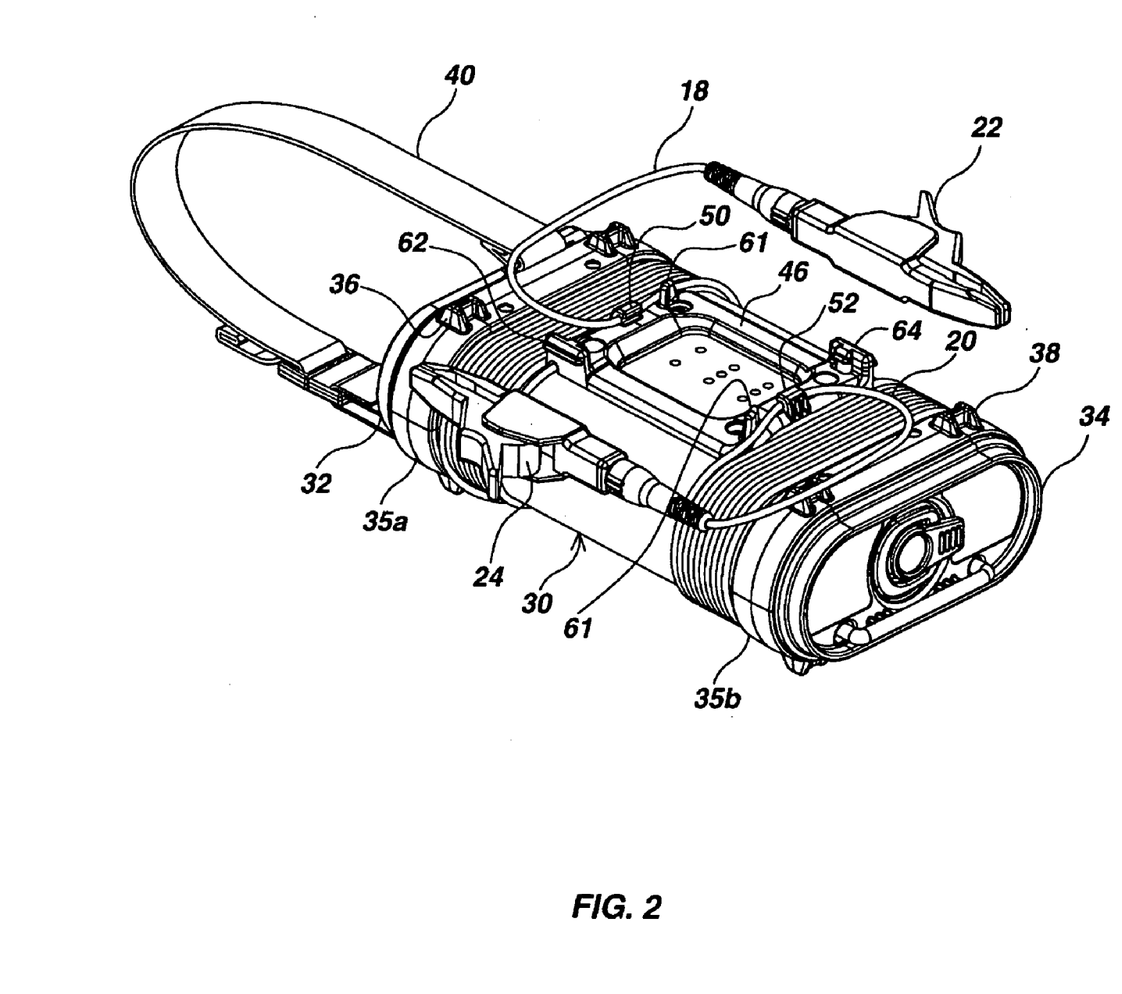
FIG. 2 is a view similar to FIG. 1 showing one of the alligator clips of the compact line illuminator detached from its attachment feature on the case.
Figure 3:
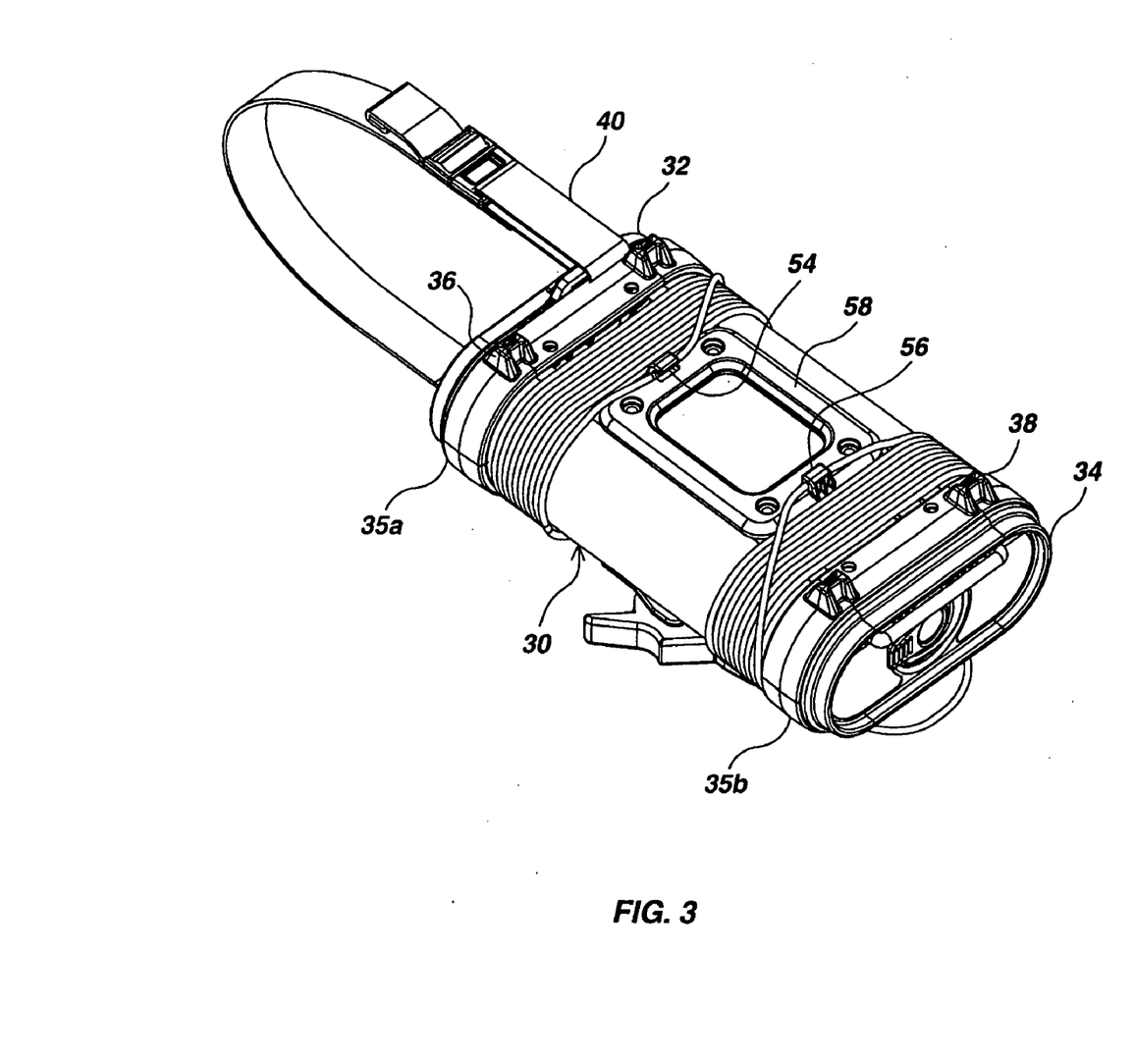
FIG. 3 is an isometric view of the underside of the compact line illuminator of FIG. 1 illustrating and a second pair of lead hooks for holding the leads in a partially wrapped state.
Figure 4:
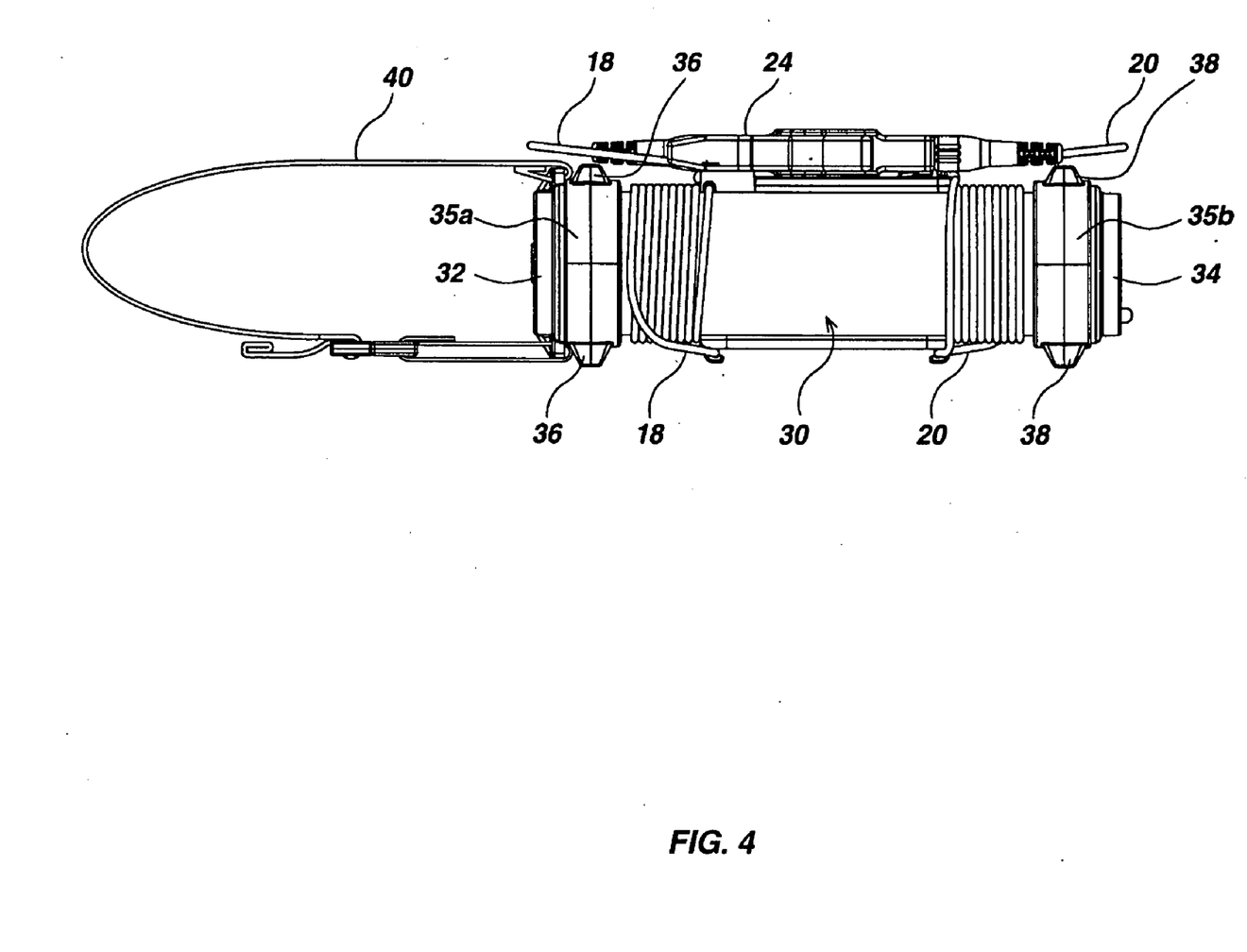
FIG. 4 is a side elevation view of the compact line illuminator of FIG. 1 showing its alligator clips secured to their respective attachment features on the case.
Figure 5:
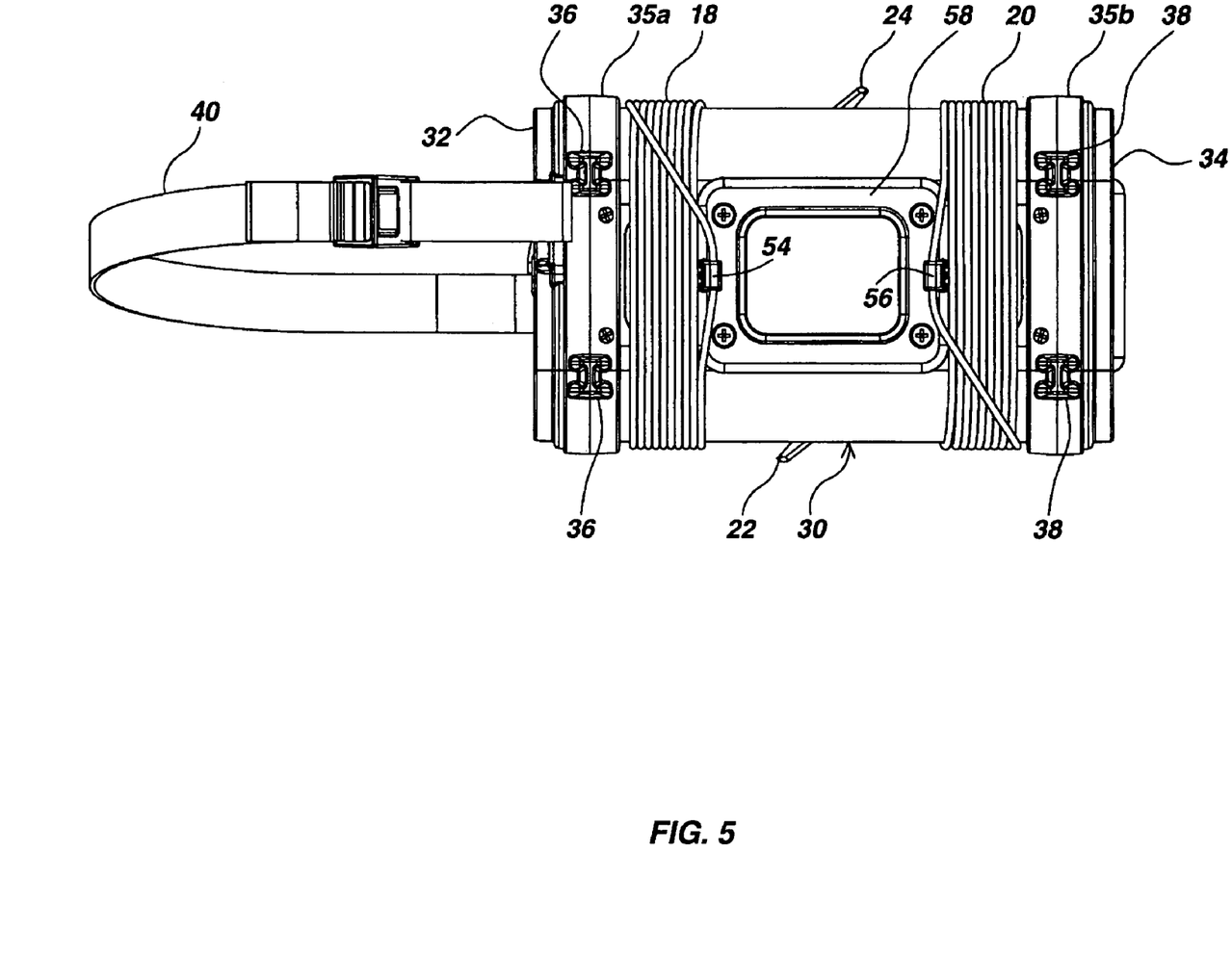
FIG. 5 is a bottom plan view of the compact line illuminator of FIG. 1.

A first pair of inverted L-shaped lead hooks 50 and 52 (FIG. 2) are formed as part of the top frame cover 46 for holding the leads 18 and 20 in a fully wrapped state for transport and storage, or optionally in a partially wrapped state (not illustrated) while in use, around the exterior of the case as illustrated in FIGS. 1 and 2. A second pair of inverted L-shaped lead hooks 54 and 56 (FIG. 3) are formed as part of a rectangular bottom frame cover 58 secured to the bottom planar section of the case 30. The bottom frame cover 58 surrounds a lower serial number label 60 (FIG. 7A). The labels 48 and 60 seal holes in the top and bottom shells 30a and 30b. The second pair of lead hooks 54 and 56 can be used to hold the leads 18 and 20 in a partially wrapped state. On occasion a technician will fully unwind both the leads 18 and 20 and then connect one alligator clip 22 to an exposed end of the pipe to be traced, and the other alligator clip 24 to the ground spike 26 after it is inserted in the ground to complete the circuit. Sometimes it is convenient to only unwind part of the leads 18 and 20, and to keep the remainder neatly wound about the case 30. In this situation a segment of each of the leads 18 and 20 intermediate its length is tucked under a corresponding one of the hooks 54 and 56. The top and bottom frame covers 46 and 58 are preferably injection molded with the hooks 50, 52, 54 and 56 formed integrally therewith. The hooks 50, 52, 54 and 56 are suitably dimensioned and configured so that they will flex and allow the leads 18 and 20 to be pinched under the same. The top frame cover 46 is also formed with angled projections 61 (FIG. 2) around which the leads 18 and 20 are wrapped. They tension the leads 18 and 20 as they emerge from their final turns and help the hooks 50 and 52 perform their lead retention function. The bottom frame cover 58 also provides a pair inner shoulders that keep the leads 18 and 20 separated.

Attachment features in the form of upstanding inverted L-shaped flanges 62 and 64 (FIG. 2) are formed on the top frame cover 46. The alligator clips 22 and 24 can pinch the vertical parts of these flanges 62 and 64 when the leads 18 and 20 are in their fully wrapped state to secure the alligator clips 22 and 24 in place. The bumpers 35a and 35b, together with the top and bottom frame covers 46 and 58 define parallel, spaced apart wrapping channels for holding the turns of the leads 18 and 20. Along with the flattened tubular case 30, they define a spool or bobbin for the leads 18 and 20 to keep them neatly and compactly stored.

A control panel mounted is on the top planar section of the case formed therein. Push button switches 66 and LEDs 68 (FIG. 6) are mounted in the center of the PC board 12 in alignment with the central rectangular aperture of the top frame cover 46. Along with the interface label 48 (FIG. 7A), the switches 66 and LEDs 68 form the control panel. The control panel includes LEDs that provide a high voltage warning indicator, three discrete frequency indicators, a power indicator and an induction mode indicator. The control panel includes push button switches that can be manually actuated by depressing dedicated regions of the flexible interface label 48. These switches include an induction mode toggle, a frequency and mode selection switch and a power ON/OFF/SELECT switch. Thus the control panel provides a keypad and display for use by the technician. The control panel could optionally include an LCD for displaying useful information. By way of example only, the available operating frequencies for the U.S. version of the compact line illuminator 10 may include 128 Hz, 1 kHz, 8 kHz, 33 kHz and 262 kHz. The operating frequencies for the European version can also include 93 kHz replacing 262 kHz.

The circuit includes an inductive antenna 71 (FIG. 6) mounted inside the case 30 to allow the signal to be induced into a buried conductor when the compact line illuminator is placed on the surface of the ground above the buried conductor. The antenna is preferably a loop stick antenna that includes an elongate cylindrical ferrite inductor 70 supported within the case 30 beneath the PC board 12. A resonator coil 72 (FIG. 8) is wrapped around the inductor 70 and is connected to a capacitor 74. An exciter coil 76 is wound on top of the resonator coil 72. The coils 72 and 76 are preferably made of Litz wire in order to minimize losses. Coil 72 is readily tunable by selectively removing turns of wire from around the inductor 70 after the coil 72 after connection to the PC board 12. The excess wire that is unwound from around the inductor (not illustrated) is not cut and removed but remains as part of the circuit and is secured inside the case 30.

Figure 8:
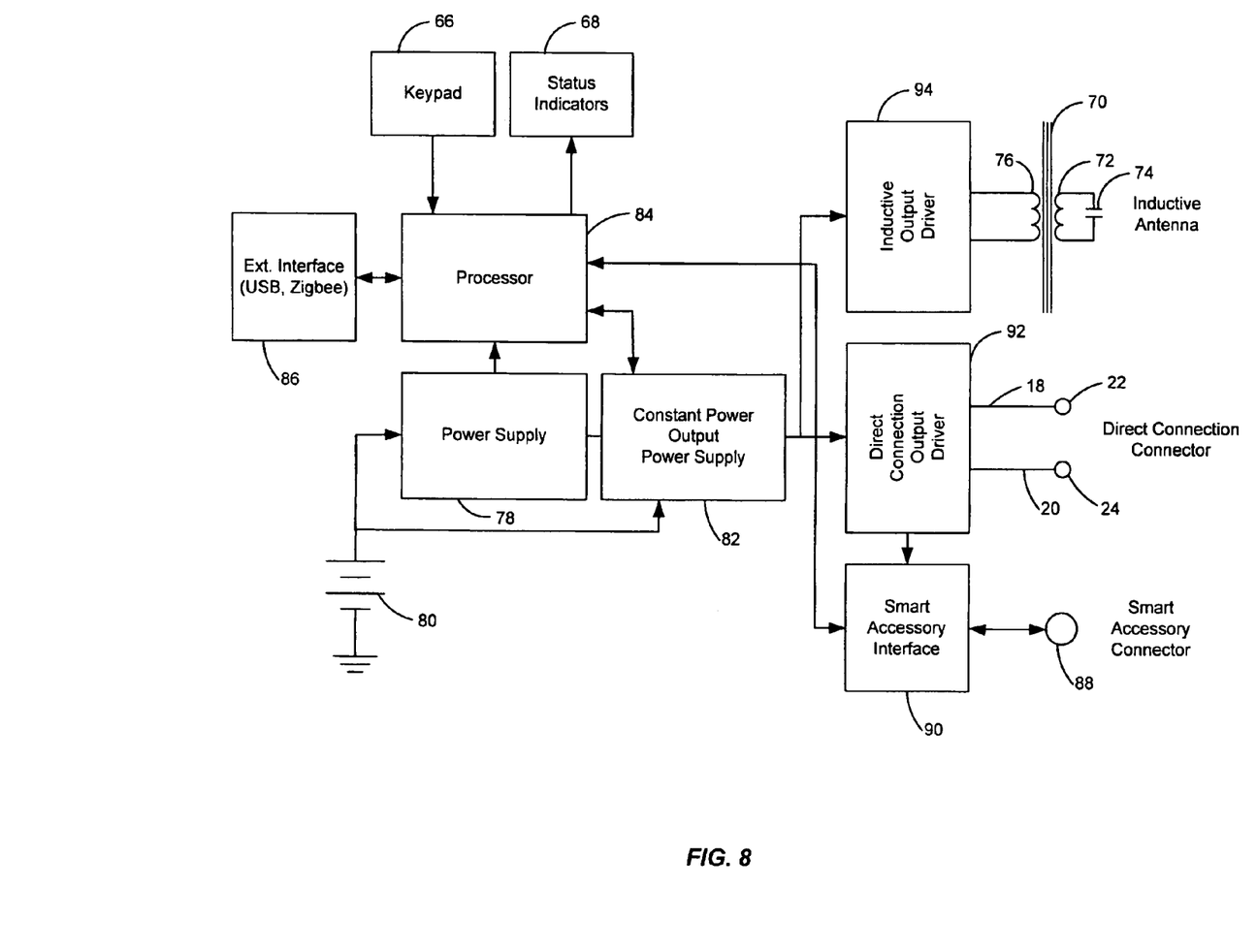
FIG. 8 is a block diagram of the circuit of the compact line illuminator of FIGS. 1-5.

Referring to FIG. 8, the circuit of the compact line illuminator 10 includes a conventional power supply 78 connected to the six C batteries 80. A constant power output power supply 82 is connected to the conventional power supply 78 and the batteries 80. Most power supply circuits regulate voltage or current. The power supply 82 ensures that a constant amount of power is supplied through the alligator clips 22 and 24, the inductive clamp, or the inductive antenna, in order to ensure that FCC limits are not exceeded and to maximize the life of the batteries 80. A processor 84 controls the constant power output supply 82. The processor 84 can communicate with a personal computer or similar device via USB, ZigBee or Bluetooth external interface 86. The interface 86 can connect the processor 84 to other remote devices by any suitable means, for example, by using Internet protocol (IP) and/or web services to retrieve and upload or download line illuminator usage data, new software, or operating frequency descriptions. The processor 84 can also communicate with a PC or other external device via port 88 (such as a connector) and accessory interface 90 which can drive both smart and dumb devices. An example of a dumb device is the alligator clip 22 which cannot communicate with the illuminator 10 and is driven by the illuminator 10 without significant feedback. An example of a smart device is any device that can communicate with the illuminator 10 through the port 88 and pass on information such as drive frequency, power level required, coupling efficiency, etc. The selected oscillating electric signal is generated and applied to the leads 18 and 20 via direct connection output driver 92. The exciter coil is driven by an inductive output driver 94. Optionally the conventional power supply 78 and the constant power output power supply 82 could be combined to provide a constant power output signal.

The compact line illuminator 10 can preferably operate in three different modes. In a direct connection mode the alligator clips 22 and 24 are connected directly to a suitable underground target conductor. Where only one end of the underground conductor is accessible, one of the alligator clips 22 or 24 is connected to the ground spike 26 when it is inserted into the ground and functions to provide a return path. Besides the ground spike, other convenient ways of establishing a connection to ground include another pipe, a metal fence post, or a metal sign post. The circuit of the compact line illuminator 10 is preferably capable of dual-frequency transmission, i.e. sending two or more frequencies onto a line simultaneously, in the direct connection mode. In an inductive clamp mode, the jaws of the inductive clamp encircle the target shielded conductor and there is no metal-to-metal contact. In the inductive antenna mode, the compact line illuminator is placed over the buried conductor to be traced and its internal antenna generates a dipole field which energizes the target conductor below ground, inducing a current in the target conductor. No ground connection is needed with the compact line illuminator is operating in its inductive clamp or inductive antenna modes. One example of a locator that can be used to trace underground energized pipes is disclosed in U.S. Pat. No. 7,009,399 granted to Mark S. Olsson et al. On Mar. 7, 2006, and in U.S. patent application Ser. No. 11/077, 947 filed Mar. 11, 2005 also of Mark S. Olsson et al., the entire disclosures of which are hereby incorporated by reference.

The compact line illuminator 10 preferably has three available power settings. LOW power provides approximately one-half watt output, MEDIUM power provides approximately two watts output and HIGH power provides approximately five watts output. The LOW power setting provides the least current and therefore the longest battery life.

Figure 10:
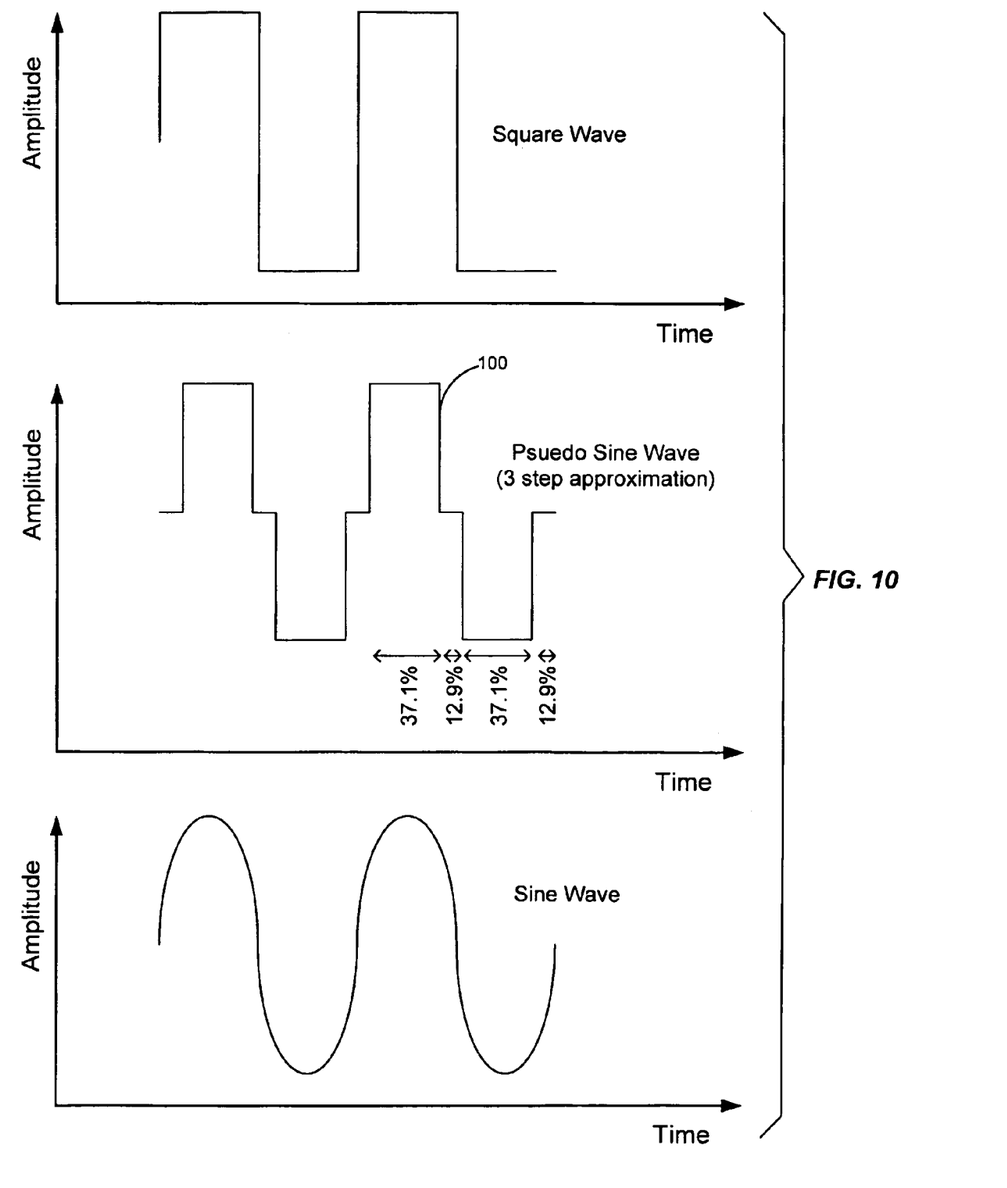
FIGS. 10 and 11 compare the time domain and frequency domain representations of square wave, pseudo sine wave and sine wave signals.
Figure 11:
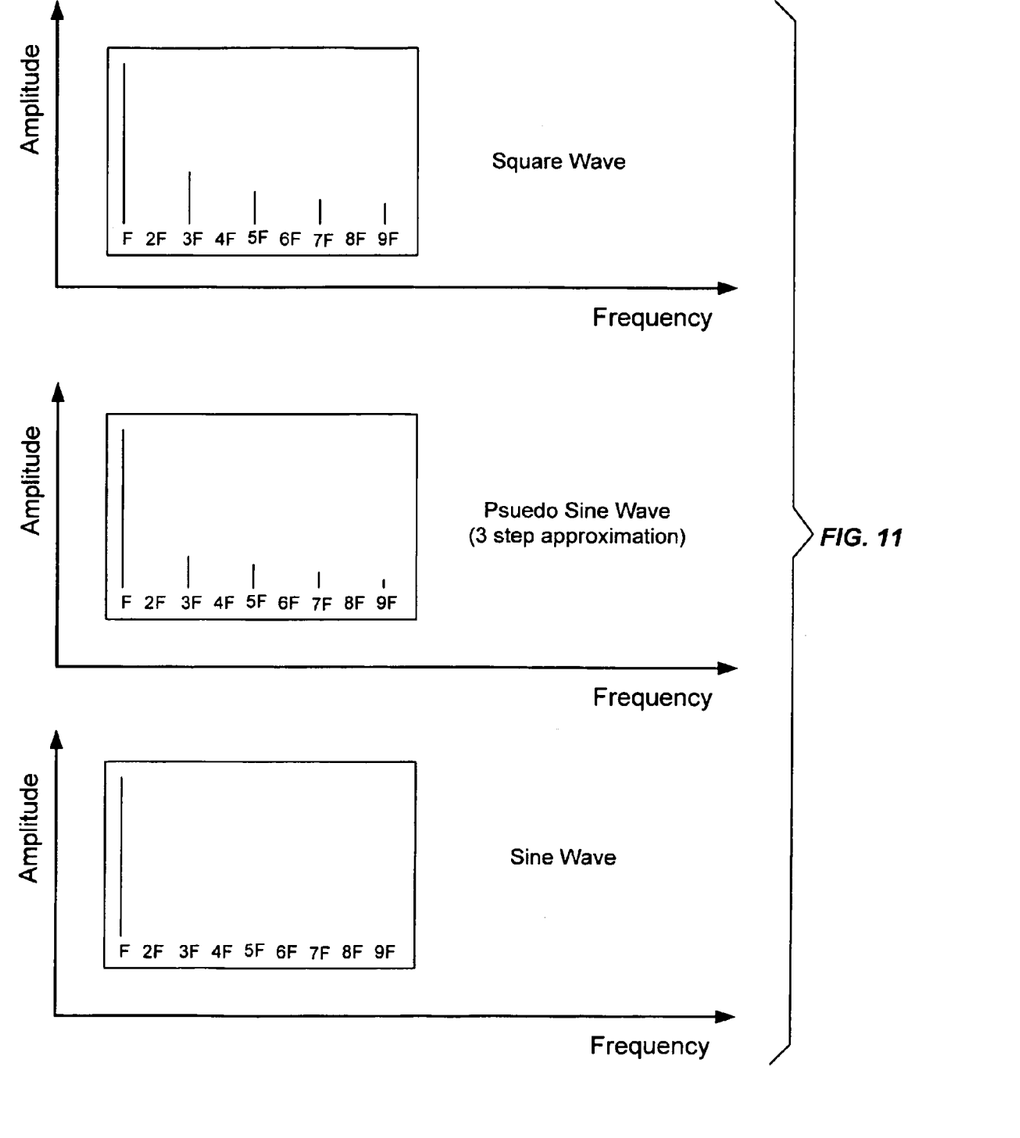

In order to optimize the power delivered to the load at a frequency the locator can detect, and in order to minimize the generation of harmonic frequencies, the circuit on the PC board 12 preferably generates a stepped approximation of a sine wave which is illustrated in FIG. 10 as pseudo sine wave 100. In this example, the ON time is approximately 74.2% of the waveform and the OFF time is approximately 25.8% of the waveform. This duty cycle maximizes the power delivered to the load at the fundamental frequency while minimizing the power consumed by the compact line illuminator 10. FIGS. 10 and 11 compare the time domain and frequency domain representations of square wave, pseudo sine wave, and sine wave signals. The ON interval is a fraction (74.2%) of a square wave half cycle. This improves the proportion of energy transmitted at the fundamental of the switching frequency.

Establishing a useful ground connection can sometimes be difficult when locating in an area with no available space to attach the ground connection or no soil into which the ground stake can be driven. If a long wire is used to connect to a ground at some location, the long wire can act as an antenna and create another field that can interfere with tracing. Use of metal plates laid onto a flat surface with a clip attached to a bent up edge is problematic. The plates are bulky to store, and worse, they do not conform to uneven surfaces. Simply unwrapping and laying part of one of the leads 18 and 20 on the ground surface will improve signal coupling to some degree. The more length of lead in contact with the surface, the better the capacitive coupling of the signal, which is more effective at higher frequencies.

Figure 12:
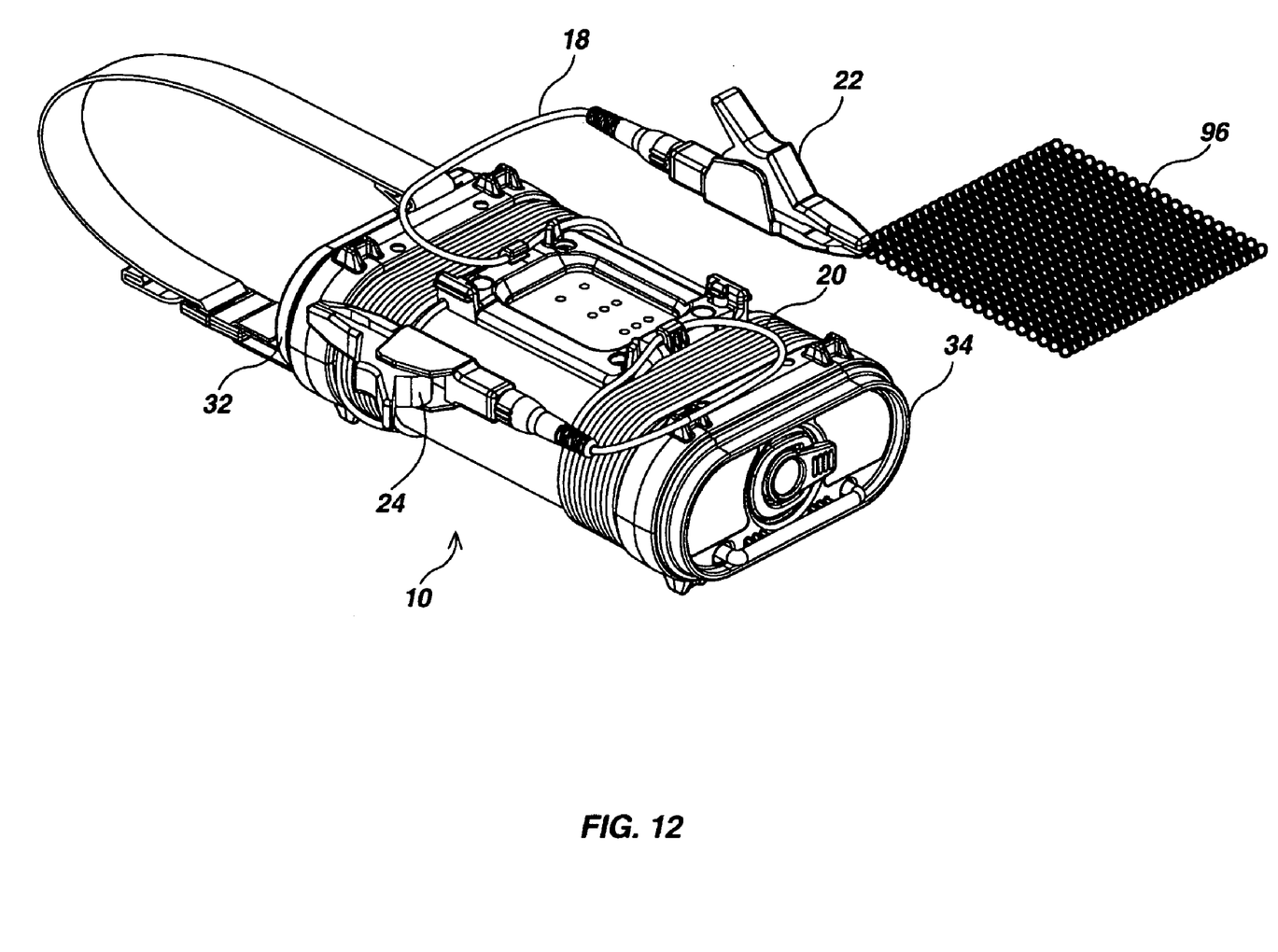
FIG. 12 is an isometric view of the compact line illuminator of FIGS. 1-5 illustrating one of its alligator clips attached to a chain mail grounding sheet.

FIG. 12 is an isometric view of the compact line illuminator 10 of FIGS. 1-5 illustrating one of its alligator clips 22 attached to an electrically conductive chain mail grounding sheet 96. The grounding sheet 96 is flexible and can be laid on an uneven cement or asphalt covered surface to improve signal coupling, particularly at transmitter frequencies of 33 kHz and 262 kHz. By way of example, the chain mail may be stainless steel four-in-one chain mail comprised of interconnected twenty-two gauge, 5/32" welded stainless steel rings. The advantages of using the chain mail 96 include ease of storage, high durability, and conformability to uneven ground surfaces. Electrical connections within the grounding sheet 96 are established by the point-to-point physical contact between the conductive rings. The grounding sheet 96 is one type of metal cloth that may be used. Suitable materials of this general type have also been made that include rivets. The grounding sheet could also be made of steel or copper alloy. Additional improvement in the ground connection can be obtained by pouring water, saline solution, potassium chloride solution or some other electrolyte solution on and/or around the grounding sheet 96. Thus the leads 18 and 20 can have their remote or distal ends connected to various means for applying the signal from the PC board 12 to a buried conductor, including alligator clips 22 and 24 or other mechanical attachment means such as terminals, jacks, clamps, etc.

While we have described an embodiment of our compact line locator, persons skilled in the art will realize that our invention is not limited to this particular embodiment. For example, the inner or proximal ends of the leads 18 and 20 could be connected to the PC board 12 via removable plugs, jacks or other electrical connectors having mating parts attached to the leads 18 and 20 and mounted in one or both of the end cap assemblies 32 and 34. The parts mounted in the end cap assemblies 32 or 34 can be connected to the PC board 12 through wiring inside the case 30. Other means for holding the leads besides hooks could be used such as channels with detents, Velcro® straps, straps with snaps, split tubes, clips, bands, pivoting arms, clasps, screw on devices, snap on devices, bayonet locks, ratchet assemblies, and so forth. Other means for holding the batteries can be used besides the tubes, such as frame elements molded into the inner side of the case itself, and slide in battery cradles. The case need not have the flattened tubular configuration, but its rounded sides are advantageous for wrapping the leads and its planar sections are advantageous for mounting the control panel. The case has a relatively low profile and is relatively small. Preferably the case has a width at least twice its height, and a length of at least one and one-half times its width. The compact line illuminator 10 can continuously broadcast status information per Bluetooth, Zigbee or other wireless protocol for receipt by a similarly equipped locator. In this fashion the locator can receive and respond to status information, such as the current operating frequency and power level of the compact line illuminator, and send commands to the compact line illuminator 10 for changing its operating parameters. In such an arrangement, the illuminator does not even need to have any user actuated controls, and therefore the control panel can be eliminated and the illuminator can be turned ON and OFF, and its settings monitored and changed, via controls on the locator using its graphic user interface (GUI). The compact line illuminator 10 need not have any internal antenna and may rely strictly upon direct connection via the leads and alligator clips, or inductive coupling via an inductive clamp. The batteries need not be contained within the case 10 and the circuit could instead be connected to an external power source. Therefore, the protection afforded our invention should only be limited in accordance with the following claims.

We claim:

1. A method of locating a buried conductor, comprising the steps of:
    generating an electric signal having at least one predetermined frequency;
    applying the signal to a buried conductor;
    establishing a ground connection using a grounding sheet overlying a surface region above the buried conductor;
    pouring an electrolyte solution on the grounding sheet and/or around a portion of the surface region adjacent the grounding sheet;
    detecting an electromagnetic signal emitted by the conductor; and
    determining a location of the conductor from the detected electromagnetic signal.

2. The method of claim 1 wherein the flexible grounding sheet is chain mail.

3. The method of claim 2 wherein the chain mail comprises a plurality of interconnected rings made of a material selected from the group consisting of steel, stainless steel and copper alloy.

4. The method of claim 1 wherein the grounding sheet is flexible.

5. The method of claim 1 wherein the electrolyte solution is selected from the group consisting of water, saline solution and potassium chloride solution.

* * * * *